United States Patent
Masek et al.

(10) Patent No.: US 12,305,800 B2
(45) Date of Patent: *May 20, 2025

(54) SEISMIC BRACING YIELD FUSE

(71) Applicant: MASEK, MCMULLING AND LARSEN, LLC, Roy, UT (US)

(72) Inventors: John P. Masek, Roy, UT (US); Paul W. McMullin, Sandy, UT (US); Blake C. Larsen, Hooper, UT (US)

(73) Assignee: MASEK, MCMULLIN AND LARSEN, LLC, Roy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,344

(22) Filed: Aug. 8, 2023

(65) Prior Publication Data

US 2024/0027019 A1    Jan. 25, 2024

Related U.S. Application Data

(63) Continuation of application No. 16/994,393, filed on Aug. 14, 2020, now Pat. No. 11,761,577.

(60) Provisional application No. 62/888,640, filed on Aug. 19, 2019.

(51) Int. Cl.
| | |
|---|---|
| *F16F 7/12* | (2006.01) |
| *F16L 3/02* | (2006.01) |
| *F16M 13/02* | (2006.01) |
| *E04H 9/02* | (2006.01) |

(52) U.S. Cl.
CPC ............ *F16M 13/02* (2013.01); *F16F 7/128* (2013.01); *F16L 3/02* (2013.01); *E04H 9/02* (2013.01)

(58) Field of Classification Search
CPC ................... F16F 7/128; E04B 2/3403; E04B 2001/2415; E04H 9/02
USPC ....... 248/560, 561, 562, 563, 564, 566, 580, 248/575, 592, 608, 609; 52/167.1, 167.3
See application file for complete search history.

(56) References Cited

U.S. PATENT DOCUMENTS

| | | | |
|---|---|---|---|
| 5,332,071 A | 7/1994 | Duncan | |
| 6,141,919 A | 11/2000 | Robinson | |
| 11,761,577 B2* | 9/2023 | Masek | F16F 7/128 248/636 |
| 2004/0135056 A1 | 7/2004 | Chuang | |

(Continued)

FOREIGN PATENT DOCUMENTS

| | | |
|---|---|---|
| CN | 217711968 U | 11/2022 |
| CN | 219451134 U | 8/2023 |

(Continued)

OTHER PUBLICATIONS

"International Search Report and Written Opinion of the International Searching Authority," issued in connection with Int'l Appl. No. PCT/US2024/043639, dated Jan. 21, 2025 (9 pages).

*Primary Examiner* — Alfred J Wujciak
(74) *Attorney, Agent, or Firm* — Holland & Hart LLP

(57) ABSTRACT

A seismic bracing yield fuse includes at least one housing member, and a fuse member housed within or mounted externally to the at least one housing member. The fuse member is configured to undergo ductile yielding in a length dimension upon application of a tensile force along the length dimension of the fuse member, and the at least one housing member is configured to accommodate a change in length of the fuse member resulting from the ductile yielding.

22 Claims, 6 Drawing Sheets

(56) References Cited

U.S. PATENT DOCUMENTS

| | | | |
|---|---|---|---|
| 2010/0205876 A1* | 8/2010 | Christopoulus | E04H 9/024 52/698 |
| 2017/0016504 A1 | 1/2017 | Braun et al. | |
| 2017/0067249 A1 | 3/2017 | Matteson | |
| 2018/0264297 A1 | 9/2018 | Poldmaa et al. | |
| 2020/0386007 A1 | 12/2020 | Lane-Lohse | |
| 2021/0054962 A1 | 2/2021 | Masek et al. | |
| 2022/0196104 A1 | 6/2022 | Holen et al. | |

FOREIGN PATENT DOCUMENTS

| | | |
|---|---|---|
| DE | 102021102545 A1 | 8/2022 |
| GB | 2539469 A | 12/2016 |
| WO | 2023/125066 A1 | 7/2023 |

\* cited by examiner

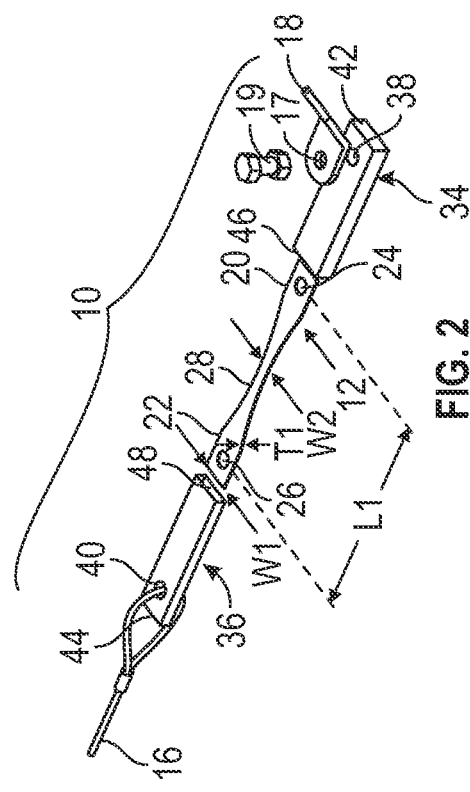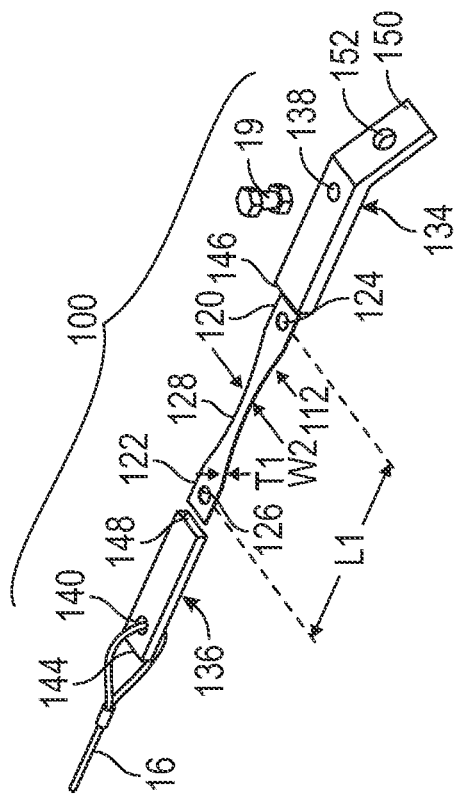

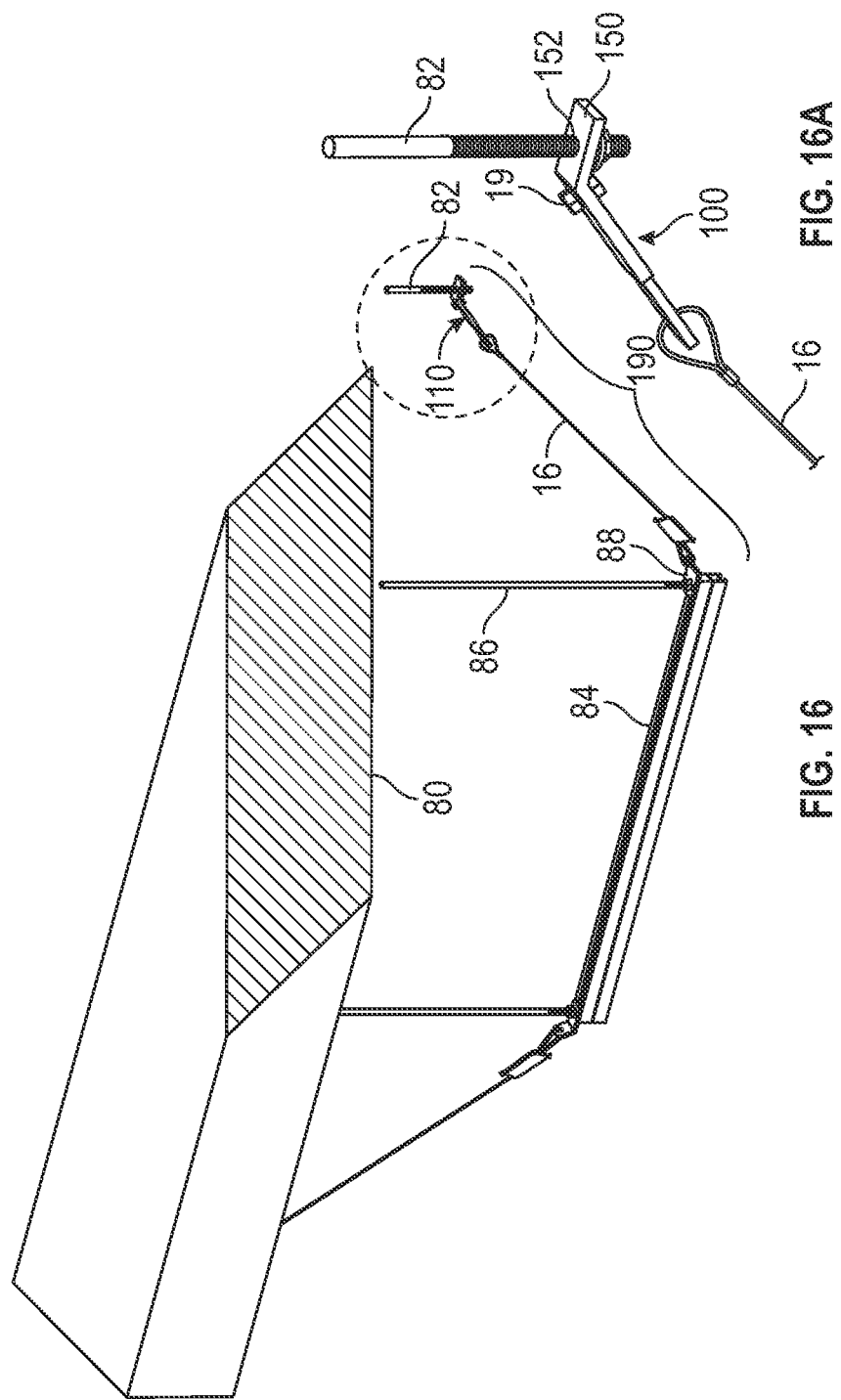

SEISMIC BRACING YIELD FUSE

CROSS-REFERENCE TO RELATED APPLICATION

This application is a continuation of U.S. patent application Ser. No. 16/994,393, filed 14 Aug. 2020, entitled "SEISMIC BRACING YIELD FUSE," which claims the benefit of U.S. Provisional Patent Application No. 62/888,640, filed 19 Aug. 2019, entitled "SEISMIC BRACING YIELD FUSE," all of which are hereby incorporated by reference in their entirety for all purposes.

TECHNICAL FIELD

The present disclosure relates generally to bracing for using in supporting nonstructural equipment from a structural member of a building. In particular, the present disclosure relates to seismic bracing for use applications, and yield fuses for use in seismic bracing.

BACKGROUND

Until the adoption of the 2012 International Building Code (IBC), which refers to the American Society of Civil Engineers (ASCE) document 7-10, the standard methodology for designing seismic braces to nonstructural items was to restrain these systems with either rigid braces or cable braces that were designed to have sufficient strength to resist seismic forces calculated based on ASCE 7-10 requirements. "Nonstructural" refers to systems other than the building structural systems (such as walls, beams, columns, building braces) themselves. Nonstructural items include piping systems, mechanical ductwork, electrical conduit and cable trays, and mechanical or electrical systems that are attached to the structure, but not part of the structure itself. It is anticipated that an Omega value concept will remain in the building code, as the structural engineering profession regards ductile yielding to be an important component of good seismic performance of structural components of buildings and more recently also nonstructural components within buildings The relative strength of brace components (i.e., the nonstructural brace itself, the nonstructural brace attachment to the nonstructural item, and the nonstructural brace attachment to the structure) is not specifically evaluated. Rather, if the brace assembly as a whole has sufficient strength and stiffness, the brace met pre-2012 IBC requirements. Beginning with the 2012 IBC, a factor referred to as "Omega" was implemented regarding the relative strength of anchors to concrete in comparison to nonstructural brace strength. This Omega factor requirement states that the force used in seismic anchor design to concrete must be increased by a factor of 2.5 unless it can be demonstrated that the connection to the structure provides ductile yielding. Since prior to the 2012 IBC requirements commercially available brace connections had been designed to be strong and rigid with respect to nonstructural brace and anchor strength, commercially available bracing products under the 2012 IBC requirements now require multiplying the anchor force by 2.5 or 250%. Building structures themselves have had similar requirements added in preceding codes beginning in the late 1990s, resulting in the development of energy absorbing ductile connection devices for large systems in building braces and beam to column assembles. These assemblies are not usable for nonstructural items due to their large size and use of heavy steel assemblies or concrete-filled tube assemblies.

For the foregoing reasons, there is a need to provide improved supports and bracing for nonstructural items that are lightweight, compact and usable with existing commercial products.

SUMMARY

The present disclosure is directed to supports and bracing for use with nonstructural items in a building. Such supports typically provide connection of a nonstructural item to a structural member (e.g., a ceiling) of a building, wall or other structural component of the building. The present disclosure may relate particularly to seismic bracing for nonstructural items, and yield fuses for use with seismic bracing.

The seismic bracing generally, and the yield fuse specifically, typically includes a lightweight, compact assembly that weighs ounces (at most less than 1-2 pounds) rather than much larger bracing that is typical for bracing used with structural features of a building. The yield fuses disclosed herein typically can be used with the many already available commercial bracing products. In one embodiment, the connection devices typically weigh between a few ounces and a pound, although larger and smaller versions are possible. The yield fuses may have several configurations to adapt to many different bracing systems. Of note, the yield fuses may permit the use of Omega=1.0 instead of Omega=2.5 as is required by the 2012 IBC requirements described above. This is achieved by the use of a ductile-yielding nonstructural brace fuse in the seismic bracing. The fuse may have any of a variety of configurations that permit some yielding under certain load conditions (e.g., a seismic event). One configuration includes a yielding "dog-bone" shaped fuse member. Another configuration includes a yielding corrugated strip fuse member. A further configuration includes at least one yielding pin fuse member. These and other configurations of the present disclosure may reduce the required anchor forces by 250% and may also provide superior brace performance by yielding of the brace fuse, rather than sudden brittle failure of either the brace anchor or the brace connectors.

Another aspect of the present disclosure relates to a seismic bracing yield fuse that includes at least one housing member and a fuse member. The fuse member is housed within or mounted externally to the at least one housing member. The fuse member is configured to undergo ductile yielding in a length dimension upon application of a tensile force along the length dimension of the fuse member. The at least one housing member is configured to accommodate a change in length of the fuse member resulting from the ductile yielding.

The fuse member may have a dog bone shape. The fuse member may have a reduced width at a location spaced between opposing ends of the fuse member. The fuse member may include a corrugated structure. The fuse member may include a rod-shaped member that is mounted to an exterior surface of the at least one housing member. The at least one housing member may have a single-piece construction and apertures formed therethrough at opposing ends of the housing member. At least one of the apertures may have a slot shape, and the fuse member may have apertures formed therethrough at opposing ends that are aligned with the housing apertures and receptive of connection features. The slot-shaped aperture may accommodate the change in length of the fuse member resulting from the ductile yielding.

The at least one housing member may include a first housing member at least partially inserted into and slidable relative to a second housing member. The seismic bracing yield fuse may also include a backup wire extending between and securing together the first and second housing members as an assembly. The seismic bracing yield fuse may include a connector bracket mounted to the fuse member and the at least one housing member. The fuse member may include a material having a different ductility than material of the at least one housing. The fuse member may have a lower ductility than a connecting member to which the seismic bracing yield fuse is connected. The at least one housing member may include an integrally formed angled portion extending from an end thereof. The at least one housing member may have a rectangular cross-sectional shape.

Another aspect of the present disclosure relates to a seismic bracing yield fuse that includes a housing assembly and a fuse member. The housing assembly includes a first housing member and a second housing member at least partially insertable into the second housing member. The fuse member is positionable within the housing assembly or mounted to the housing. The fuse member has an elongate construction and is plastically deformable in a length dimension upon application of a force.

The housing assembly may include housing connector apertures formed in opposing ends thereof, wherein the housing connector apertures are receptive of connection members to connect the seismic bracing yield fuse to a non-structural item. The non-structural item may include at least one of piping systems, mechanical ductwork, electrical conduit and cable trays, and mechanical or electrical systems. The fuse member may include fuse connector apertures formed in opposing ends thereof, wherein the housing apertures are aligned with the fuse connector apertures and receptive of the connection members. The first and second housing members may each include mounting tabs positioned on exterior surfaces thereof, wherein the mounting tabs are configured to mount the fuse member to the housing assembly. The seismic bracing yield fuse may include first and second fuse members arranged in parallel and mounted to exterior surfaces of the fuse assembly.

A further aspect of the present disclosure relates to a method of assembling a seismic bracing yield fuse. The method includes providing a housing assembly and a fuse member, the fuse member being configured to undergo ductile yielding in a length dimension upon application of a tensile force along the length dimension of the fuse member, mounting the fuse member internal the housing assembly or to an exterior of the housing assembly, and providing connection features to secure opposing ends of the fuse member to a connection assembly for application of the tensile force.

Another aspect of the present disclosure relates to a method of providing a ductile yield in a connection assembly that supports nonstructural equipment from a structural member of a building. The method includes providing a seismic bracing yield fuse having a housing and a fuse member, connecting the seismic bracing yield fuse in series between the structural member and the nonstructural equipment, and applying a tensile force to the fuse member until the fuse member undergoes ductile yielding.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label.

FIG. 1 is a perspective view of a seismic bracing yield fuse in accordance with the present disclosure.

FIG. 2 is an exploded perspective view of the seismic bracing yield fuse shown in FIG. 1.

FIG. 3 is a perspective view of another example of seismic bracing yield fuse in accordance with the present disclosure.

FIG. 4 is an exploded perspective view of the seismic bracing yield fuse shown in FIG. 3.

FIG. 16 shows the seismic bracing yield fuse of FIG. 3 in an environment in which the seismic bracing yield fuse connects a nonstructural item to a structural member of a building.

FIG. 16A is a closeup view of the seismic bracing yield fuse shown in FIG. 16.

Figure 6:
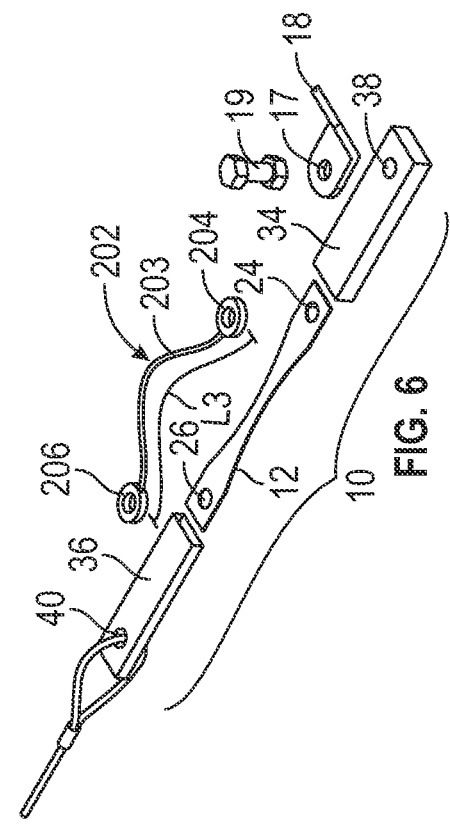
FIG. 6 is an exploded perspective view of the seismic bracing yield fuse shown in FIG. 5.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure is directed to bracing and/or connecting devices for use in supporting nonstructural items from a structural member in a building. Such structural members, when formed from concrete, may include concrete flat slabs, concrete waffle slabs, concrete panel slabs, concrete over metal deck, concrete beams, or concrete columns within aa building or facility. The fuse device may also be used when attaching nonstructural seismic bracing to other structural members, such as masonry walls, steel beams, steel columns, steel trusses, metal grating, or any other structural member that comprises the building or structure itself. A fuse member may be used as part of the bracing to support the nonstructural item from the structural member of the building. The fuse may be characterized as a seismic bracing yield fuse at least in part because the bracing is used as a bracing member to support the nonstructural item from a structural member of a building in the event of a seismic event. The yield fuse may refer to the fuse being configured to yield when a load above a threshold amount is applied to the seismic bracing and/or fuse, such as during a seismic event. The use of a yielding fuse may permit use of an Omega factor of 1.0 rather than the otherwise required Omega factor of 2.5 under the 2012 IBC requirements discussed above.

The embodiments for a seismic bracing yield fuse disclosed herein with reference to the figures are exemplary only. The general principles applicable to these yield fuses may be used in other related embodiments and designs to help avoid the need to use an Omega factor of 2.5 under the 2012 IBC requirements. As discussed above, using an Omega factor of 1.0 greatly enhances a designer's ability to create a seismic bracing design that is cost-effective and meets practical size and weight limitations associated with supporting nonstructural items in a building.

Refer now to FIGS. 1 and 2, an example of seismic bracing yield fuse 10 is shown and described. The seismic bracing yield fuse 10 includes a fuse member 12 (shown in FIG. 2), a housing assembly 14, a first connector member 16 (e.g., wire), a second connector member 18 (e.g., bracket), and a fastener 19 used to secure the second connector member 18 to the housing assembly 14. The fastener 19 may be a bolt, screw, rivet or other fastener. The second connector 18 may include an aperture 17 to receive the fastener 19 as shown in FIG. 2.

Referring to FIG. 2, the fuse member 12 includes first and second ends 20, 22, first and second fuse apertures 24, 26, and a reduced width portion 28. The fuse member 12 has a width $W_1$ in the area adjacent to the first and second fuse apertures 24, 26, a length $L_1$ between the first and second fuse apertures 24, 26, a thickness $T_1$, and a reduced width $W_2$ in the area of the reduced width portion 28 at a location spaced between the first and second apertures 24, 26. The fuse member 12 may be referred to as having a dog bone shape. The limited amount of material in the reduced width portion 28 as compared to other locations along the length of the fuse member 12 may result in the fuse member 12 yielding first in the area of the reduced width portion 28 upon application of a tensile load or force along the length of the fuse member 12. The tensile load may be applied via the first and second apertures 24, 26. The first and second connector members 16, 18 may be mounted to the fuse member 12 via the first and second fuse apertures 24, 26. The yielding of the fuse member 12 may result in an elongation of the fuse member 12, thereby increasing the length $L_1$. The amount of tensile force applied to the fuse member 12 typically is insufficient to elongate the fuse member 12 to the point of failure (i.e., the fuse member 12 breaking into two pieces).

The housing assembly 14 includes first and second housing members 34, 36 that have respective first and second housing apertures 38, 40. The housing members 34, 36 include a closed end 42, 44, respectively, and an open end 46, 48, respectively. The first housing member 34 defines an internal cavity sized to receive the second housing member 36 in a sliding engagement as shown in FIG. 1. The internal cavities of both the first and second housing members 34, 36 are sized to receive portions of the fuse member 12. The sliding arrangement between the first and second housing members 34, 36 permits relative movement such that a spacing between the first and second housing apertures 38, 40 (length $L_2$) may vary depending on changes in the length of fuse member 12.

Figures 15, 15A:
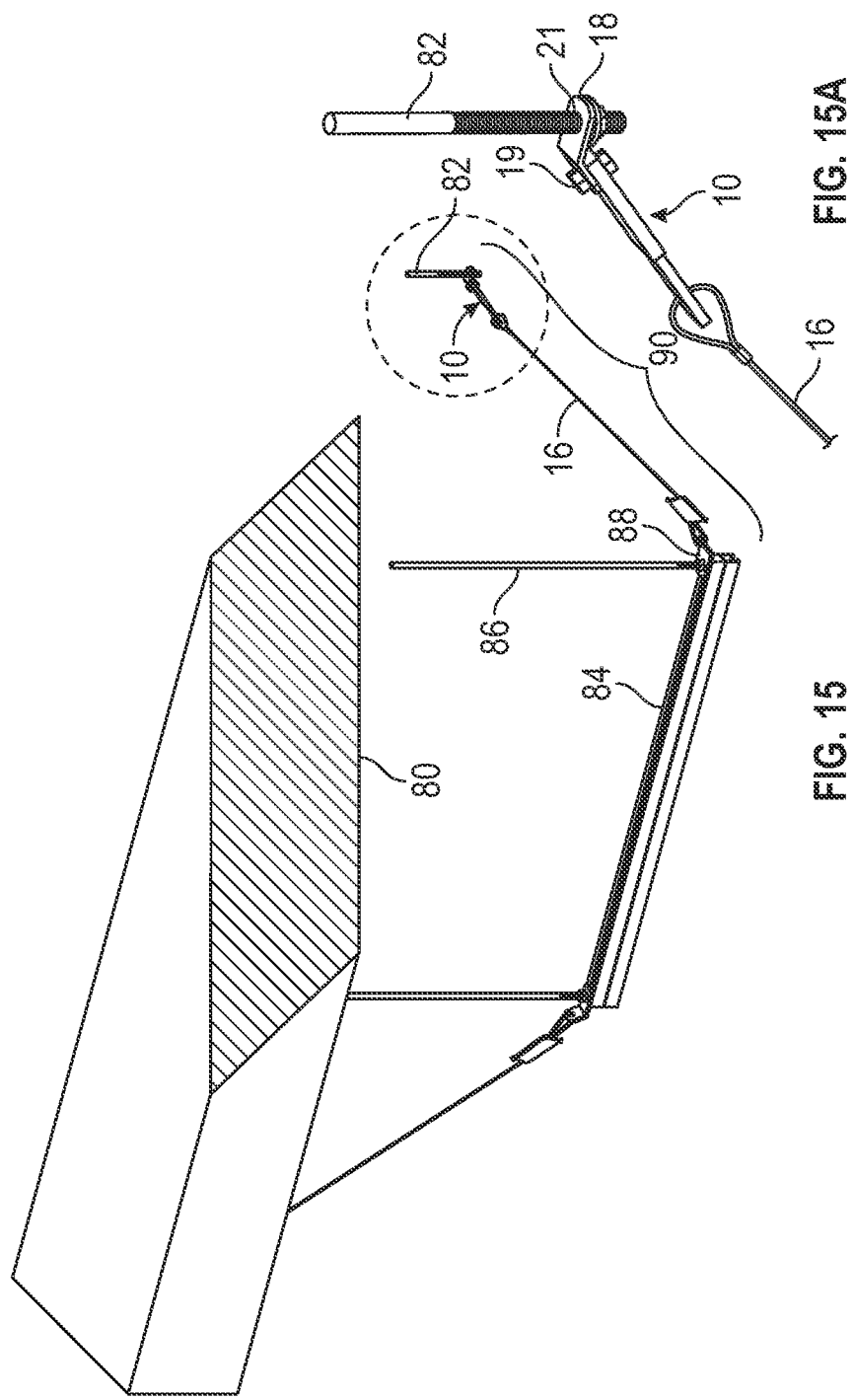
FIG. 15 shows the seismic bracing yield fuse of FIG. 1 in an environment in which the seismic bracing yield fuse connects a nonstructural item to a structural member of a building.
FIG. 15A is a closeup view of the seismic bracing yield fuse shown in FIG. 15.

When assembled, the seismic bracing yield fuse 10 provides for the first fuse aperture 24 to be aligned with the first housing aperture 38, the second fuse aperture 26 to be aligned with the second housing aperture 40, the first connector member 16 to extend through the apertures 26, 36, and the fastener 19 to extend through the first apertures 24, 34 to secure the second connector member 18 to the housing assembly 14. The second connector member 18 extends beyond the closed end 42 of the first housing member 34. The second connector member 18 may have a bent or angled shape and an aperture 21 to promote connection of the seismic bracing yield fuse 10 to a nonstructural item or to nonstructural ceiling mount or connector as shown in FIGS. 15 and 15A. For example, the second connector member 18 may be secured to a seismic ceiling mount 82 that is secured to a ceiling 80 of a building. The first connector member 16 may be connected to a nonstructural item 84 via a nonstructural ceiling connector 88. The nonstructural item 84 may be secured to the ceiling 80 with a nonstructural ceiling mount 86. Typically, the nonstructural item 84 is secured to the ceiling 80 with two nonstructural ceiling mounts 86 and two seismic bracing yield fuses 10 that are part of a seismic bracing assembly 90.

Refer now to FIGS. 3 and 4, another example seismic bracing yield fuse 100 is shown and described. The seismic bracing yield fuse 100 includes many of the same or similar features as described above with reference to seismic bracing yield fuse 10 but with the second connector member integrated into the housing assembly.

Figure 14:
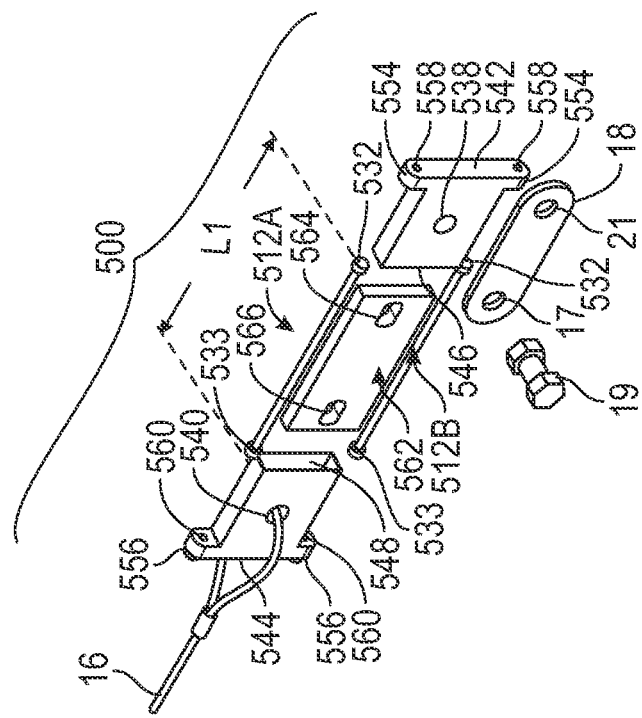
FIG. 14 is an exploded perspective view of the seismic bracing yield fuse shown in FIG. 13.

The seismic bracing yield fuse 100 includes a fuse member 112, a housing assembly 114, first and second connector members 16, 18, and a fastener 19. The fuse member 112 includes first and second ends 120, 122, first and second fuse apertures 124, 126, and a reduced width portion 128. Generally, the fuse member 112 has the same or similar construction as the fuse member 12 described above with reference to FIGS. 1 and 2. The housing assembly 114 includes first and second housing members 134, 136, first and second housing apertures 138, 140, closed ends 142, 144, and open ends 146, 148. The first housing member 134 as shown in FIG. 14 includes an extension 150 having an extension aperture 152. A length $L_2$ between the apertures 138, 140 may be the same or similar to a length $L_1$ between the apertures 124, 126 of the fuse member 12 prior to application of a tensile force to the fuse member 112 that causes yielding (i.e., increasing in the length of $L_1$). The length $L_2$ may change by relative movement of the first and second housing members 134, 136 via the sliding engagement therebetween.

FIG. 16 illustrates the seismic bracing yield fuse 100 in an environment where a nonstructural item 84 is mounted to a ceiling 80 of the building structure. FIG. 16a is a closeup view of the seismic bracing yield fuse 100 as part of a seismic bracing assembly 190. The first housing member 134 is connected to a seismic ceiling mount 82 via the extension 150 and aperture 152. The extension 150 may be hollow like remaining portions of the first housing member 134. In other embodiments, the extension 150 has a solid construction to provide improved strength and durability at the connection point to the seismic ceiling mount 82.

The seismic bracing yield fuse 100 may have advantages over the embodiments shown in FIGS. 1 and 2. For example, the seismic bracing yield fuse 100 may include fewer parts, thereby requiring less assembly time, storage, and the like as compared to the embodiments shown in FIGS. 1 and 2. Other advantages may also be possible [Inventors, please provide any insights here about advantages].

Figure 5:
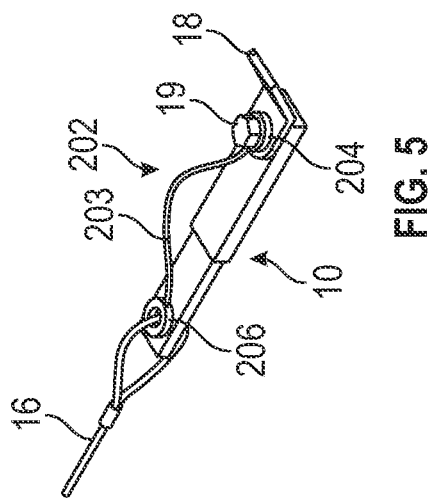
FIG. 5 is a perspective view of another seismic bracing yield fuse in accordance with the present disclosure.

FIGS. 5 and 6 illustrate another example seismic bracing yield fuse 200 that includes the seismic bracing yield fuse 10 with an additional backup wire 202. The backup wire 202 includes first and second wire connectors 204, 206 positioned at opposing ends as shown in FIG. 6. The first wire connector 204 is configured to align with the fuse aperture 24, housing aperture 38, and aperture 17 of the second connector 18 through which the fastener 19 is inserted to provide an assembly of those parts. The second wire connector 206 is configured to align with the second fuse aperture 26 and the second housing aperture 40 and be receptive of the first connector member 16 to provide assembly of those parts as shown in FIG. 5. The backup wire 202 may function as a safety measure to ensure that the assembly of parts of the seismic bracing yield fuse, in particular the assembly of the housing members 34, 36 remains intact in the event that there is failure of the fuse member 12.

The backup wire 202 may comprise a wire having the same or greater strength than, for example, the first connector member 16. The backup wire 202 may be flexible along its length to permit relative movement between the first and second housing members 34, 36, such as during yielding of the fuse member 12. The backup wire 202 may have a length $L_3$ between the apertures of the first and second wire connectors 204, 206 as shown in FIG. 6. The length $L_3$ may be greater than length $L_1$ and length $L_2$, and may be greater than any length $L_1$ that is possible up to the point of failure of the fuse member 12. In some embodiments, the length $L_3$ is sufficient short to prevent yielding of the fuse member 12 to a point of failure, such as a length $L_3$ that is equal to or less than the length $L_1$ achieved prior to the point of failure of the fuse member 12.

The first and second wire connectors 204, 206 may be formed integral as a single piece with a wire portion 203 of the backup wire 202. In other embodiments, the first and second wire connectors 204, 206 may be formed as separate connector members that are secured to the wire portion 203 in a later assembly step, such as by welding or the like.

The backup wire 202 may be used with any of the embodiments disclosed herein to provide an improved safety constraint that prevents disassembly of the seismic bracing yield fuse in the event of the fuse member failing. In the applications shown in FIGS. 15 and 16, the backup wire 202 may prevent disconnection of the seismic ceiling mount 82 from the first connector member 16.

Figure 8:
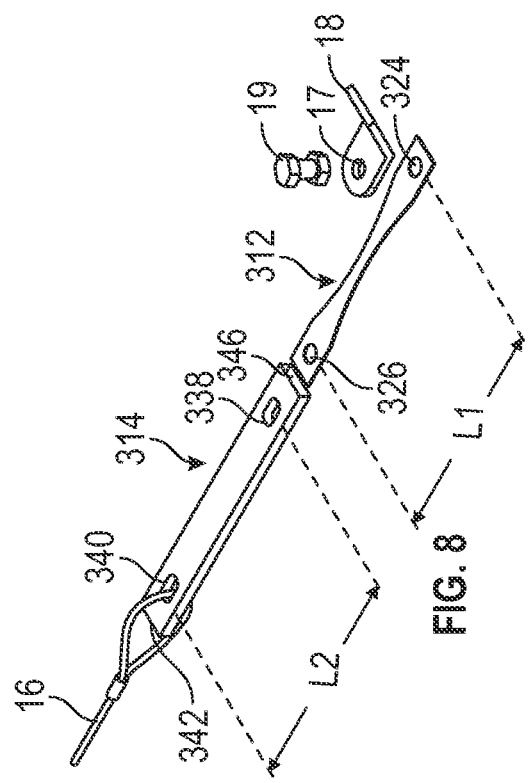
FIG. 8 is an exploded perspective view of the seismic bracing yield fuse shown in FIG. 7.
Figure 7:
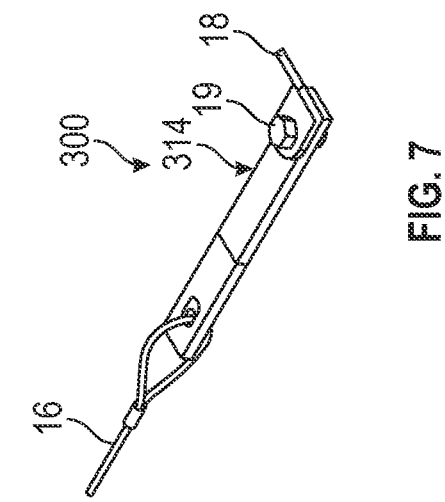
FIG. 7 is a perspective view of another seismic bracing yield fuse in accordance with the present disclosure.

FIGS. 7 and 8 illustrate another example seismic bracing yield fuse 300 having a fuse member 312, a housing assembly 314, a first connector member 16, a second connector member 18, and a fastener 19 used to connect the second connector member 18 via an aperture 17.

The fuse member 312 is shown having the same or similar construction as the dog bone shaped fuse member 12, 112 described above with reference to FIGS. 1-6. The housing assembly 314 has a single-piece construction with a closed end 342 and an open end 346 and first and second housing apertures 338, 340. The apertures 338, 340 may have a slot-shaped construction, also referred to as an elongate shape or oval shape. The spacing between the apertures 338, 340 may have a length $L_2$. The shape of the apertures 338, 340 may accommodate changes in the length $L_1$ between apertures 324, 326 of the fuse member 312. The change in length $L_1$ may occur as a result of yielding of the fuse member 312 under application of a tensile force along the length of the fuse member 312, such as during a seismic event when the seismic bracing yield fuse 300 is used with bracing for a nonstructural item within a building (e.g., the environments shown in FIGS. 15 and 16).

Use of a single housing member may have advantages over the multi-piece housing assemblies described above with reference to FIGS. 1-6. For example, a seismic bracing yield fuse having a single piece housing member requires fewer parts, reduced assembly time, and a reduced risk of the first and second connector members 16, 18 becoming disconnected from each other in the event the fuse member 312 fails. [Inventors, are there other advantages for this embodiment?]

Figure 10:
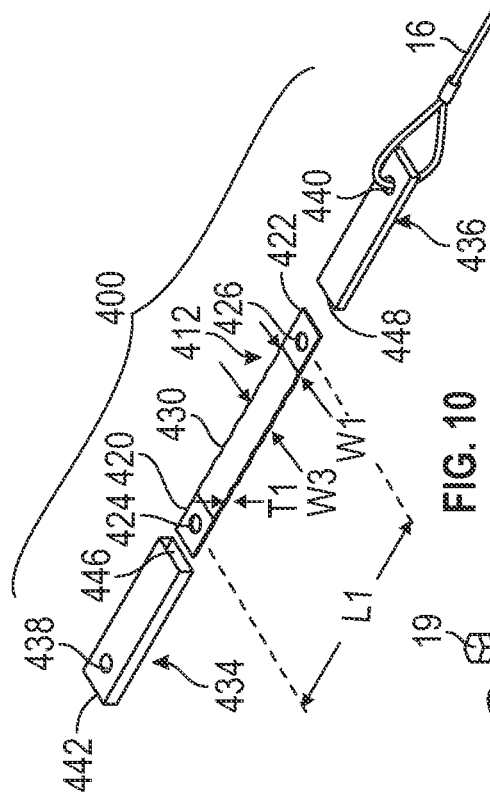
FIG. 10 is an exploded perspective view of the seismic bracing yield fuse shown in FIG. 9.
Figure 12:
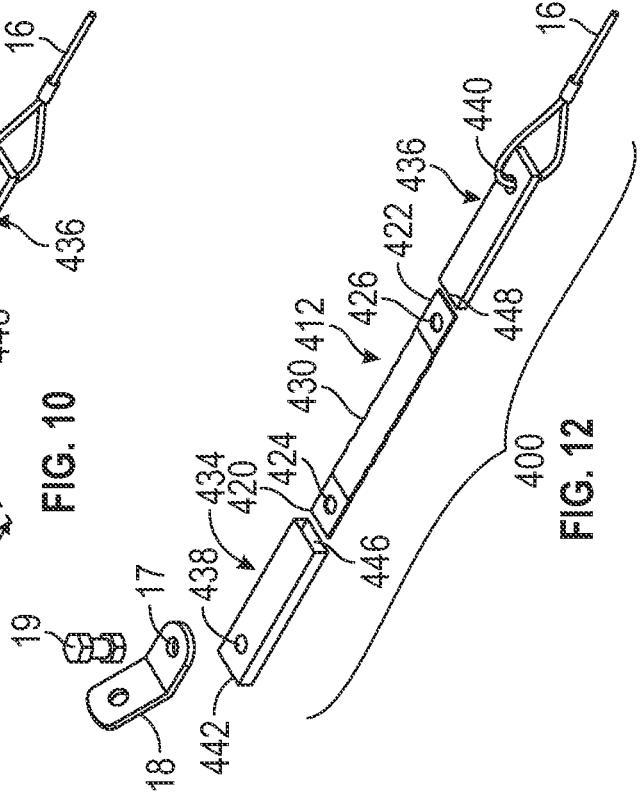
FIG. 12 is an exploded perspective view of the seismic bracing yield fuse shown in FIG. 11.
Figure 9:
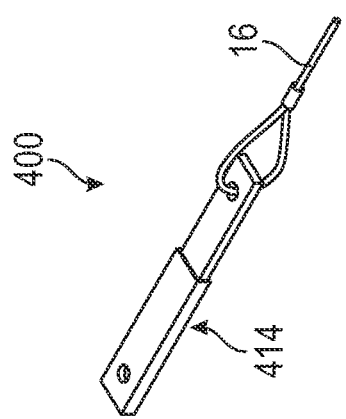
FIG. 9 is a perspective view of another example of seismic bracing yield fuse in accordance with the present disclosure.
Figure 11:
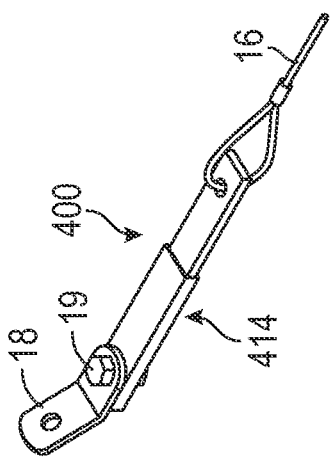
FIG. 11 is a perspective view of another example of seismic bracing yield fuse in accordance with the present disclosure.

FIGS. 9 and 10 illustrate another example seismic bracing yield fuse 400 that includes a fuse member 412, a housing assembly 414, and a first connector member 16. FIGS. 11 and 12 illustrate the seismic bracing yield fuse 400 with a second connector member 18 having an aperture 17, and a fastener 19 to secure the second connector 18 to the other components of the seismic bracing yield fuse 400.

The fuse member 412 may have a different configuration and provide a different function as compared to the dog bone-shaped fuse member included in the embodiments disclosed above with reference to FIGS. 1-8. The fuse member 412 may include first and second ends 420, 422, first and second fuse apertures 424, 426, a corrugated portion 430 having a width $W_3$, a length $L_1$ between the apertures 424, 426, a width $W_1$ near the apertures 424, 426, and a thickness $T_1$.

The housing assembly 414 includes first and second housing members 434, 436, first and second housing apertures 438, 440, closed ends 442, 444, and open ends 446, 448. The housing assembly 414 may have many of the same or similar features as the housing assembly 14 described above. When assembled, the apertures 424, 426 are aligned with the apertures 438, 440 of the housing assembly 414 and the aperture 17 of the second connector member 18 (i.e., in the embodiment of FIGS. 11 and 12). Application of a tensile force in the length dimension of the fuse member 414 via the first and second connector members 16, 18 may result in elongation or yielding of the fuse member 414. The yielding may include straightening of the folds or bends of the corrugation 430 and the fuse member 412. The yielding may include flattening or straightening of some of the corrugations and/or flattening or straightening of all of the corrugations.

The corrugated portion 430 may be formed as a separate piece that is connected to opposing end portions of the fuse member 412 using a separate connection step. Alternatively, the corrugated portion 430 is formed as a single-piece with remaining portions of the fuse member 412.

In other embodiments, the corrugated portion 430 may have a different profile than the generally rectangular-shaped outer profile shown in FIGS. 10 and 12. For example, the corrugated portion 430 can have a necked down or dog bone-shaped profile as described above with reference to fuse member 12, 112, 312. The corrugation may have a variety of different shapes and sizes to provide different amounts of yielding for different applied tensile forces. The corrugated portion 430 shown in FIGS. 10 and 12 includes a generally wavy shape along its length.

Figure 13:
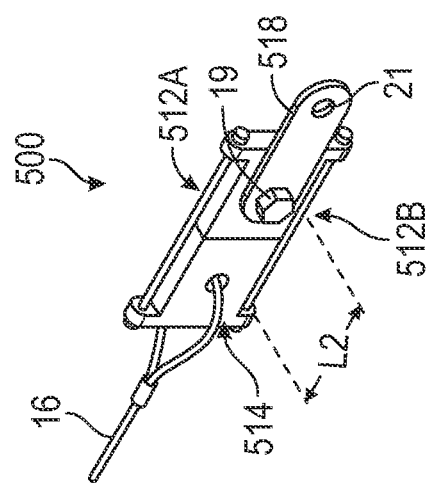
FIG. 13 is a perspective view of another example of seismic bracing yield fuse in accordance with the present disclosure.

FIGS. 13 and 14 illustrate another example seismic bracing yield fuse 500 wherein one or more fuse members 512 are positioned exterior the housing assembly 514. The fuse member 512 may include first and second fuse members 512a, 512b that each include first and second ends 520, 522 and first and second retaining members 532, 533 positioned at the opposing ends 520, 522. The fuse members 512a, 512b may have a generally elongate construction. In some embodiments, the fuse members 512a, 512b have a circular cross-sectional shape and may be referred to as rods. Other cross-sectional shapes are possible. Further, the generally constant cross-sectional shape and diameter and/or maximum width of the fuse members 512a, 512b shown in FIGS. 13 and 14 may be changed to be variable in other embodiments. In at least one example, one or more of the fuse members 512a, 512b may include a reduced diameter/maximum width portion along its length to promote yielding at a certain location along the length and/or yielding at a specific tensile force or load application.

The housing assembling 514 includes first and second housing members 534, 536 having first and second housing apertures 538, 540 with closed ends 542, 544, respectively, and open ends 546, 548, respectively. The first housing member 534 includes a pair of mounting tabs 554, and the second housing member 536 includes a pair of mounting tabs 556. The mounting tabs 554, 556 include mounting apertures 558, 560, respectively. Mounting tabs 554, 556 may be used to secure the fuse members 512a, 512b to the housing assembly 514. The retaining members 532, 533 of the fuse members may be used to retain the fuse members 512a, 512b to the housing assembly 514 by preventing removal of the fuse members from the mounting apertures 558, 560.

In some embodiments, the first second housing members 534, 536 are sized so that one is insertable into the other and they are arranged in a sliding interface with each other to permit a change in length $L_2$ between the housing apertures 538, 540. In other embodiments, the first second housing members 534, 536 are abutted end-to-end and include an additional housing insert 562 (see FIG. 14) having insert apertures 564, 566 that provide an interconnection between the housing members 534, 536 with the apertures 564, 566 aligned with the housing apertures 538, 540. The insert apertures 564, 566 may have an elongate shape (e.g., similar to the elongate shape of the apertures 338, 340 described above with reference to FIGS. 7 and 8) that permit some elongation of the housing assembly 514 during yielding of the fuse members 512a, 512b upon application of the tensile force along the length of the yield fuse 500. That is, as the length $L_1$ of the fuse members 512a, 512b increases, the length $L_2$ between the housing apertures 538, 540 is able to increase even with the insert 562 and associated apertures 564, 566 connected to the housing members 534, 536. In other embodiments, the housing apertures 538, 540 may have an elongate, slot-shaped construction and the apertures 564, 566 may have either a circular construction or also include an elongate, slot-shaped construction (e.g., the shape shown in FIG. 14) to permit the change in length $L_2$ as needed.

The application of a tensile force may be applied using the first connector 16 shown in FIGS. 13 and 14 and a second connector 518. The connector 518 may have any of a variety of shapes and sizes, such as the angled bracket shape shown with reference to FIGS. 1 and 2, or the generally flat shape shown in FIGS. 13 and 14. The second connector 518 may include an aperture 17 to receive the fastener 19 to connect the second connector 518 to the housing assembly 514. The second connector 518 may also include a second aperture 521 used to secure the seismic bracing yield fuse 500 to another structure such as the seismic ceiling mount 82 or a non-structural ceiling connectors 88 shown with reference to FIGS. 15 and 16.

The embodiment of FIGS. 13 and 14 may utilize portions of a housing assembly 514 to transfer the tensile forces to the fuse members 512a, 512b. Furthermore, the housing assembly shown in FIGS. 13 and 14 are not used as protective structure to enclose the fuse members 512a, 512b, such as to protect the fuse members from environmental conditions and associated damage. The embodiments disclosed with reference to FIGS. 1-12 provide a housing assembly that is intended to function primarily as a protecting structure for the fuse member. The housing member shown with reference to FIGS. 1-12 may be configured in a way such that they do not transfer the tensile forces to the fuse member, but instead are intended specifically not to transfer tensile forces to the fuse members. The fuse members described with reference to FIGS. 1-12 may in some embodiments be used as a seismic bracing yield fuse independent of the housing assembly. That is, the housing assembly shown in the embodiments of FIGS. 1-12 may be removed without influencing the ability of the seismic bracing yield fuse to provide its intended function of providing a yield fuse in a seismic bracing application for a non-structural item of a building. The housing assemblies described with reference to FIGS. 1-12 may also be referred to as a protecting device, an enclosure for the fuse member, or the like to better indicate its function to protect the fuse member from environmental conditions such as, for example, during assembly of the seismic bracing yield fuse with a bracing or connecting assembly for the non-structural item, or during use to protect the fuse member from water, other corrosive environmental conditions, or impact by other items such as during installation of other piping, ducting, wiring or the like in the immediate vicinity of the non-structural item being supported by the seismic bracing.

The fuse members disclosed herein may comprise a variety of different materials, and particularly metal materials. Some example materials for use as the fuse member include, for example, mild steel (A36 or similar). However, aluminum or copper may also be used. Other non-ferrous materials may be used in combination with or in place of metal materials for the fuse members. Insulating washers could be incorporated into the fuse to inhibit corrosion if materials other the steel are used. Alternatively, commercially available insulating washers could be provided with the fuses if insulating washers were not incorporated into the fuses. The type of materials used for the housing assemblies disclosed herein may be of less importance with exception to the embodiment shown in FIGS. 13 and 14 where the housing assembly is intended to transfer the tensile forces to the fuse members and thus provide a more structural, force transferring function. In some embodiments, the housing assembly may provide a sealed enclosure for the fuse member.

The first and second connector members disclosed herein may comprise one or more of a variety of different materials. For example, the first connector member 16 may comprise a metal wire. The metal wire may be encased or coated with a non-corrosive material such as plastic, silicone or the like. The second connector member 18 may be comprised of a similar material to that used in the fuse yielding element, or may be a dissimilar material, as described herein.

Typically, the seismic bracing yield fuse as disclosed herein have a relatively small size. For example, the lengths $L_1$, $L_2$ are typically in the range of about 1.5 inches to about 6 inches, and more particularly about 1.5 inch to about 3 inches. The length is determined by the length of material needed to develop desired ductile yielding effects while also being of sufficient strength to resist typical seismic bracing forces. The width $W_1$, $W_2$ typically is in the range of about 0.75 inches to about 2 inches. The total weight of the seismic bracing yield fuse (i.e., the fuse member and housing assembly without the first and second connector members) typically is in the range of about 4 ounces to about 20 ounces, depending upon the fuse capacity.

The seismic bracing yield fuses as disclosed herein are specifically designed for use as part of seismic bracing for non-structural items in a building structure, as described above in detail. The size, strength, characteristics, and yield strength of the fuse members for the seismic bracing yield fuse as disclosed herein are on a scale that is much different from fuses used for structural building components such as the beams, brackets and bracing used to define the walls, ceiling, floors, etc. of the building structure itself. Thus, the problem being solved in association with seismic bracing is on a completely different scale. A person of ordinary skill in the art of seismic bracing would have no need to look to fuse members for structural building components because of the vastly different problems being solved, the scale of the features involved, and the like.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A seismic bracing yield fuse, comprising:
at least one housing member; and
a fuse member housed within or mounted externally to the at least one housing member, the fuse member being configured to undergo ductile yielding in a length dimension upon application of a tensile force along the length dimension of the fuse member, the at least one housing member being configured to accommodate a change in length of the fuse member resulting from the ductile yielding, and the at least one housing member being configured to not transfer tensile forces to the fuse member, wherein the fuse member has a dog bone shape.

2. The seismic bracing yield fuse of claim 1, wherein the fuse member includes a corrugated structure.

3. The seismic bracing yield fuse of claim 1, wherein the at least one housing member has a single-piece construction and apertures formed therethrough at opposing ends of the housing member, at least one of the apertures having a slot shape, and the fuse member has apertures formed therethrough at opposing ends that are aligned with the housing apertures and receptive of connection features, the slot-shaped aperture accommodating the change in length of the fuse member resulting from the ductile yielding.

4. The seismic bracing yield fuse of claim 1, wherein the at least one housing member includes a first housing member at least partially inserted into and slidable relative to a second housing member.

5. The seismic bracing yield fuse of claim 4, further comprising a connector bracket mounted to the fuse member and the at least one housing member.

6. The seismic bracing yield fuse of claim 1, wherein the fuse member comprises a material having a different ductility than material of the at least one housing.

7. The seismic bracing yield fuse of claim 1, wherein the fuse member has a lower ductility than a connecting member to which the seismic bracing yield fuse is connected.

8. A seismic bracing yield fuse, comprising:
at least one housing member; and
a fuse member housed within or mounted externally to the at least one housing member, the fuse member being configured to undergo ductile yielding in a length dimension upon application of a tensile force along the length dimension of the fuse member, the at least one housing member being configured to accommodate a change in length of the fuse member resulting from the ductile yielding, and the at least one housing member being configured to not transfer tensile forces to the fuse member, wherein the at least one housing member has a single-piece construction and apertures formed therethrough at opposing ends of the housing member, at least one of the apertures having a slot shape, and the fuse member has apertures formed therethrough at opposing ends that are aligned with the housing apertures and receptive of connection features, the slot-shaped aperture accommodating the change in length of the fuse member resulting from the ductile yielding.

9. The seismic bracing yield fuse of claim 8, wherein the fuse member has a reduced width at a location spaced between opposing ends of the fuse member.

10. The seismic bracing yield fuse of claim 8, wherein the fuse member includes a corrugated structure.

11. The seismic bracing yield fuse of claim 8, wherein the fuse member comprises a material having a different ductility than material of the at least one housing.

12. The seismic bracing yield fuse of claim 8, wherein the fuse member has a lower ductility than a connecting member to which the seismic bracing yield fuse is connected.

13. A seismic bracing yield fuse, comprising:
at least one housing member; and
a fuse member housed within or mounted externally to the at least one housing member, the fuse member being configured to undergo ductile yielding in a length dimension upon application of a tensile force along the length dimension of the fuse member, the at least one housing member being configured to accommodate a change in length of the fuse member resulting from the ductile yielding, and the at least one housing member being configured to not transfer tensile forces to the fuse member, wherein the at least one housing member includes a first housing member at least partially inserted into and slidable relative to a second housing member.

14. The seismic bracing yield fuse of claim 13, wherein the fuse member has a reduced width at a location spaced between opposing ends of the fuse member.

15. The seismic bracing yield fuse of claim 13, wherein the fuse member includes a corrugated structure.

16. The seismic bracing yield fuse of claim 13, wherein the fuse member comprises a material having a different ductility than material of the least one housing.

17. The seismic bracing yield fuse of claim 13, wherein the fuse member has a lower ductility than a connecting member to which the seismic bracing yield fuse is connected.

18. A seismic bracing yield fuse, comprising:
at least one housing member; and
a fuse member housed within or mounted externally to the at least one housing member, the fuse member being configured to undergo ductile yielding in a length dimension upon application of a tensile force along the length dimension of the fuse member, the at least one housing member being configured to accommodate a change in length of the fuse member resulting from the ductile yielding, and the at least one housing member being configured to not transfer tensile forces to the fuse member, wherein the at least one housing member includes a first housing member at least partially inserted into and slidable relative to a second housing member; and
a connector bracket mounted to the fuse member and the at least one housing member.

19. The seismic bracing yield fuse of claim 18, wherein the fuse member has a reduced width at a location spaced between opposing ends of the fuse member.

20. The seismic bracing yield fuse of claim 18, wherein the fuse member includes a corrugated structure.

21. The seismic bracing yield fuse of claim 18, wherein the fuse member comprises a material having a different ductility than material of the at least one housing.

22. The seismic bracing yield fuse of claim 18, wherein the fuse member has a lower ductility than a connecting member to which the seismic bracing yield fuse is connected.

* * * * *